United States Patent [19]

Lamb

[11] Patent Number: 4,512,104
[45] Date of Patent: Apr. 23, 1985

[54] APPARATUS FOR HARVESTING MAPLE TREE SAP

[76] Inventor: Robert M. Lamb, Box 368, Rte. 49, Bernhards Bay, N.Y. 13028

[21] Appl. No.: 563,056

[22] Filed: Dec. 19, 1983

[51] Int. Cl.³ ............................................ A01G 23/00
[52] U.S. Cl. .......................................... 47/52; 47/53
[58] Field of Search ...................... 47/50, 51, 52, 53; 138/89; 222/563

[56] References Cited

U.S. PATENT DOCUMENTS

| | | | |
|---|---|---|---|
| 3,465,925 | 9/1969 | Bertolli | 222/563 |
| 4,299,053 | 11/1981 | Foote | 47/52 |

FOREIGN PATENT DOCUMENTS

| | | | |
|---|---|---|---|
| 1096637 | 3/1981 | Canada | 47/50 |
| 229582 | 1/1911 | Fed. Rep. of Germany | 222/563 |
| 733440 | 7/1955 | United Kingdom | 47/52 |

*Primary Examiner*—Robert A. Hafer
*Assistant Examiner*—Bradley M. Lewis
*Attorney, Agent, or Firm*—Bruns and Wall

[57] ABSTRACT

Apparatus for harvesting maple sap that includes a molded tap having a housing containing an enclosed chamber, a spout having an inlet hole passing into the chamber and a line connector depending downwardly having an outlet hole that also communicates with the chamber. A plug having an elongated tapered stopper for closing the inlet hole is secured by a lanyard to the housing. A bracket is disposed outwardly from the top of the housing that has a hole passing therethrough for receiving the stopper of the plug therein in friction locking engagement so that the plug can be safely and securely stored when it is removed from the inlet hole.

3 Claims, 5 Drawing Figures

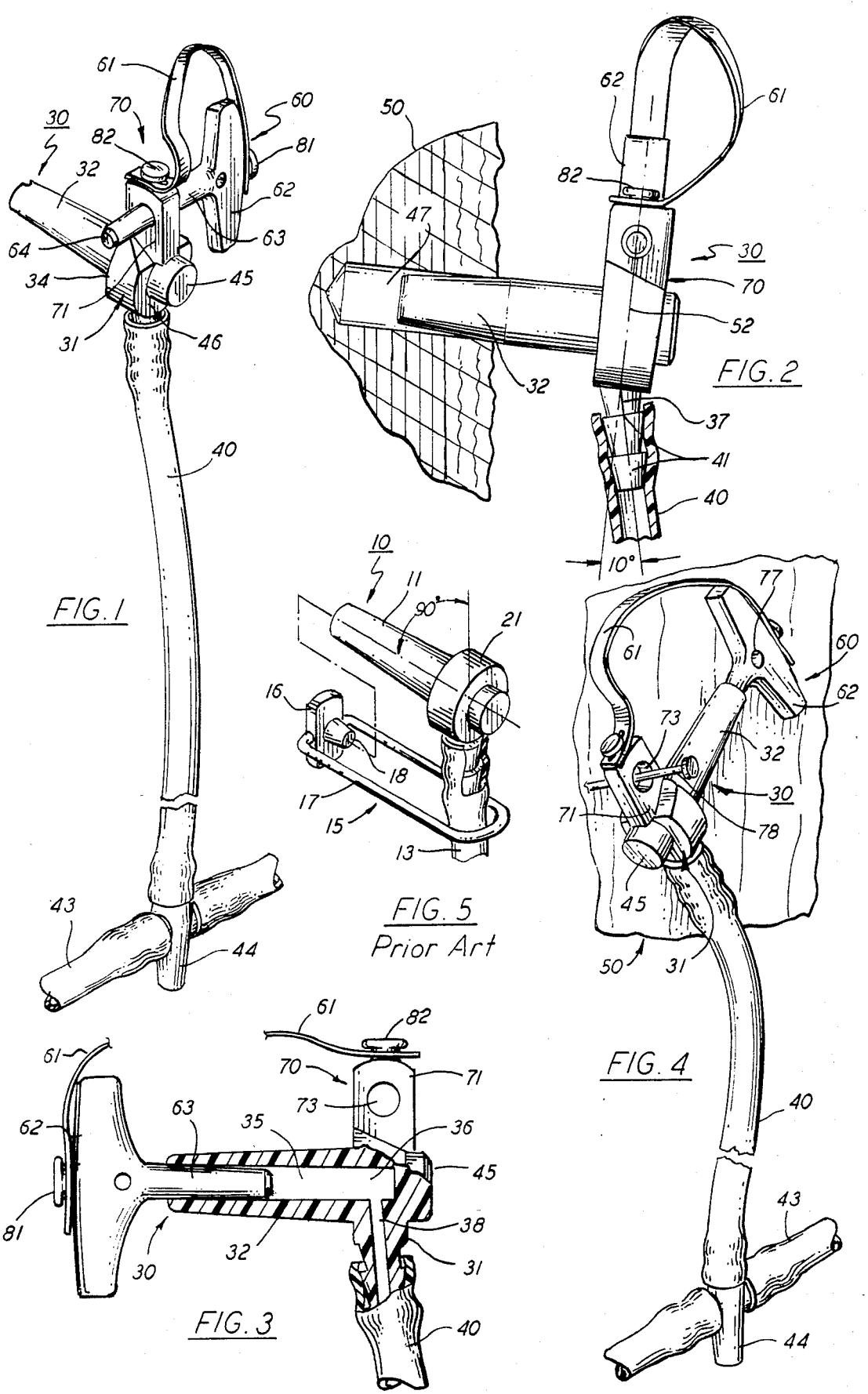

APPARATUS FOR HARVESTING MAPLE TREE SAP

BACKGROUND OF THE INVENTION

This invention relates generally to the harvesting of maple tree sap used in the production of maple syrup and, in particular, to a tree-insertable tap that can be easily and securely closed when the tap is not in use or during periods when the lines used to bring the sap to a production shed are being cleaned.

In the commercial harvesting of maple sap used in the production of syrup, it is not uncommon for the producer to have tens of thousands of taps working at any one time. Where the terrain permits, the main and branch lines leading to the production shed are arranged to transport the harvested sap to the shed under the influence of gravity. Otherwise, where the land is flat, pumps must be used. Each of the taps is connected into the main or branch lines by means of a relatively short drop line.

Maple sap will become rancid if it is allowed to stagnate in any one place for a relatively short period of time. Care, therefore, is taken, even when the sap is running, to avoid low regions in the lines where the sap might stagnate and eventually spoil. Rancid sap contained in the lines can contaminate running sap passing through the effected regions and thus degrade or even spoil an entire production run. Similarly, after the sap has been gathered, the lines must be washed out before being placed in storage. Washing is generally accomplished by running a rinse solution through the lines including the drop lines leading to the taps. In northern latitudes, where gnawing rodents are not a problem, the lines are generally left upon the trees all year long. In other areas where rodents are prevalent, the lines are taken down and washed prior to being placed in storage. During the wash process, the taps are removed from the tap holes and the spout holes closed before the rinse solution is introduced into the lines. To insure that each drop line is throughly cleaned, the spout hole of each tap may be opened for a short period of time to permit some of the solution to bleed through the spout. The spout is then quickly closed and the closure device allowed to remain in place until such time as the tap is to be inserted into a tap hole. As can be seen, where tens of thousands of taps are involved, these opening and closing operations can be arduous and time consuming.

Pluggable taps of all types have been known and used in the art for quite some time. These pluggable taps range from devices utilizing simple short insertable stoppers to more complex devices having means for locking the stopper in the spout hole. Short untethered stoppers are extremely difficult to handle, particularly when the workers are wearing gloves, and often times are dropped and lost in foliage or snow. A short stopper sometimes will not provide a very secure closure because of the lack of bearing surface provided between the stopper and the spout and can thus easily fall out of the spout hole. Small insects of all types can then find their way into the lines thereby clogging the lines and rendering them unsuitable for use during the next harvest.

Bulkier threaded-type closures are sometimes used that are connected to the taps by means of a lanyard or the like and are thus readily available when needed. Once the closure is threaded onto the spout, it will provide a relatively good seal for a limited period of time. However, because the mating parts are typically made of plastic, the integrity of the fit is degraded with use and changes in climate and the tap eventually leaks at the threaded joint. The threaded taps are also relatively expensive to manufacture when compared to simpler plug devices and are extremely difficult to manipulate during cold weather consuming a good deal of the operator's time particularly where thousands of taps are involved.

SUMMARY OF THE INVENTION

It is therefore an object of the present invention to improve taps used for drawing sap from trees.

Another object of the present invention is to provide a tap for drawing sap from a tree that can be easily and securely plugged when the tap is placed in a stored condition or when the lines servicing the tap are being cleaned.

A still further object of the present invention is to provide a tap for drawing sap from a tree that has a bracket upon which a tap plug can be securely mounted for storage when the tap is inserted into a tree.

Yet another object of the present invention is to protect the drop line servicing a tree tap when the spout of the tap is contained within a tap hole.

These and other objects of the present invention are attained by means of a spout assembly having a housing containing an enclosed chamber and an elongated spout outwardly exposed from the front face of the housing having an axially-aligned inlet hole passing therethrough that communicates with the chamber. A cylindrical hose connecter extends downwardly from the housing that also has an outlet hole passing therethrough which communicates with said chamber whereby sap drawn into the housing through the inlet hole will be allowed to flow under the influence of gravity through the outlet hole. A closure device is attached by suitable means to the housing which contains a tapered elongated plus that is slidably received in the spout hole of the tap and which can be frictionally locked against the spout hole to provide a secure leaktight joint therebetween. A bracket is also disposed upwardly from the housing having a plug-receiving hole passing therethrough into which the plug of the closure device can be passed for retaining the closure device in a stored condition when not in use.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 1 is a perspective view of a spout assembly embodying the teachings of the present invention that is capable of being used to harvest maple sap from a tree;

FIG. 2 is an enlarged side elevation of the spout assembly shown in FIG. 1 with portions broken away to further illustrate the spout of the assembly inserted within the truck of a tree;

FIG. 3 is also an enlarged side elevation of the instant spout assembly showing the spout being closed by means of a tappered plug;

FIG. 4 is a perspective view of the instant spout assembly showing the plug inserted therein and further illustrating the assembly being hung from the tree in a stored condition; and FIG. 5 is a perspective view of a prior art device heretofore used to plug the spout of a tap.

DESCRIPTION OF THE INVENTION

Turning initially to FIG. 5, there is illustrated a spout unit 10 that is presently well known and widely used in the art. The unit includes an elongated spout 11 of hollow construction that communicates with a hollow tube connector 12 so that sap drawn from a tree will flow directly into a drop line 13 passed over the connector. To close the spout hole when required, there is provided a stopper unit 15 that includes a backing plate 16, an expandable loop 17 and a short plug 18 disposed outwardly from the inside face of the plate. The loop must be stretched during insertion of the plug to allow the plug to enter the spout hole. Upon insertion, the loop bears against the line connector just below the body section 21 of the tap and applies a continuous biasing pressure upon the backing plate to hold the plug securely seated within the spout hole.

This prior art closure device acts quite well to both secure the plug within the spout hole and to prevent the plug from being separated from the assembly and thus becoming lost. It should be noted, however, that the expandable loop is generally molded of a deformable plastic material which can lose its elasticity in cold weather. Accomplishing the insertion and/or removal of the plug when the worker is wearing gloves is also extremely difficult. The plug must also be relatively short in order for it to pass easily over the spout. Incomplete sealing of the plug against the spout may result thus allowing rinse solution to be lost when the lines are being washed. The loss of solution from one tap might not be of great consequence, however, the loss of wash solution from a number of taps can cause some problems.

It should also be noted that the center line of the spout contained in the prior art tap is positioned at about a right angle with the center line of the hose connector. Tap holes, on the other hand, that are drilled in the tree are usually slanted upwardly so that the sap drawn from the tree will flow in a downward direction into the spout. As a consequence, when the spout of the tap is driven into the tap hole, the connector, and the attached drop line, are inclined inwardly towards the trunk of the tree. The drop line can thus inadvertently be forced into the bark of the tree when the spout is being driven home. If the tree is old and has thick, sharp bark, the drop line can become damaged as the spout is being driven into the tap hole.

Turning now to FIGS. 1 through 4, there is shown a spout assembly, generally referenced 30, that embodies the teachings of the present invention. The assembly includes a cylindrical housing 31 having an elongated tappered spout 32 outwardly disposed from the front face 34 thereof. The spout contains an axially aligned hole 45 passing therethrough which communicates with an enclosed chamber 36 contained within the housing. A drop line connector 37 depends downwardly from the bottom of the housing. The connector also contains an axially-aligned hole 38 that passes upwardly into the chamber 36. Accordingly, sap fed into the chamber through the inlet hole will flow under the influence of gravity through the connector and be passed directly through the outlet hole into the drop line 40.

The drop line connector 37 includes a series of circumferential ribs 41—41 formed in the outer wall thereof that are adapted to engage the interior wall of the drop line 40 in gripping engagement to establish a leak-tight joint therebetween. The rib sections, as best seen in FIG. 2, slant downwardly to permit the line to be easily slipped thereover. Once the line is in place, however, it is gripped tightly by the ribs and cannot be inadvertently dislodged from the connector. The drop line 40 normally hangs down from the housing and is connected into a branch line 43 by means of a T-connector 44 of well-known construction. It is important to note that the drop line, which is formed of a plastic material, must be maintained in the generally vertical position when either hanging on the tree or when placed in storage to prevent the line from taking permanent set which might adversely effect the flow of sap therethrough. Lines which have taken permanent sets of this nature must be replaced in the system thus adding to the cost of syrup production.

A pad 45 is carried on the back face 46 of the housing. The pad provides a reinforced striking surface by which the spout of the assembly can be driven into a tap hole. The pad is axially aligned with the spout so that when struck, as for example by a hammer or mallet, the force of the blow is transmitted axially along the spout. As best illustrated in FIG. 2, the tap hole 47 is normally bored or drilled into the trunk 48 of a tree 50 at a slight uphill angle to permit the sap entering the spout hole of the assembly to flow in a generally downhill direction. Accordingly, when the spout is received in the tap hole, it is placed at a slight incline as shown. In the present assembly, the drop line connector 37 is turned outwardly from the vertical axis 52 of the housing at an angle that is slightly greater than the angular displacement of the tap hole from the horizontal. An angle of about ten degrees is usually found suitable for this purpose. This points the connector away from the outer surface of the tree, and as a consequence, the drop line 40 will be supported well away from the tree bark thereby preventing it from being crushed or otherwise torn on any sharp surface of the bark.

A T-shaped plug 60 is secured to the assembly by means of a flexible strap 61 so that the plug remains permanently attached to the assembly. The plug includes a head 62 that can be conveniently engaged by the fingers of a gloved hand and manipulated as will be described below, and an elongated tapered shank 63 that expands rearwardly from the end face 64 towards the head 62 of the unit. As best seen in FIG. 3, the tapered body of the plug is adapted to be slideably received within the spout hole 35 of the spout assembly. The angle of the plug taper is made different than that of the spout hole in order to prevent the two mating parts from becoming so tightly bound in assembly that it might become impossible to separate the two without the aid of special tools.

In practice, both the spout assembly and the closure unit are molded from the same relatively hard plastic material using conventional molding techniques. By using a relatively hard plastic and unmatched tapers, the plug can be hand turned into the spout hole with sufficient locking force to prevent the plug from pulling out of the hole under normal operating conditions while at the same time permitting easy hand removal of the plug. In practice, the plug should, when locked in place, penetrate the spout hole a distance that is about equal to one-half the total axial length of the spout to insure that sufficient contact surface is generated between the two locking members to provide for a secure leak-tight joint.

A bracket 70 is disposed upwardly from the top of the tap housing. The bracket is used to store the plug unit 60 once it has been removed from the spout hole. The bracket is molded as an integral part of the spout assembly and includes a generally rectangular-shaped body section 71 having a tapered hole 73 passing therethrough. As best illustrated in FIG. 1, the plug section of the closure unit is passed into the tapered hole during storage to support the unit in an easily-accessible location. Here again, the angle of the hole taper is not identically matched with the plug taper in order to prevent binding. A strap 61, formed of a thin flexible strip, is used to connect the plug to the spout assembly. The strap prevents the plug from being separated from the assembly and thus being lost. The strap is of sufficient length and flexibility to permit the plug to be easily inserted and turned within either spout hole or the bracket hole. The strap contains a button hole 80 at each end thereof. A first button 81 is carried on the top surface of bracket 70 and a second button 82 is similarly carried on the back of the plug head 62. In assembly, the strap is connected over the buttons as shown to securely connect the plug to the spout assembly.

As previously noted, in northern latitudes where gnawing rodents are not a problem, the lines used to bring the sap to the processing shed are generally left upon the trees all year long. During the storage period of the year, the taps are removed from the tap holes and the spout is closed as illustrated in FIG. 4 by means of the attached plugs. The feeder lines connecting the spout assemblies to the main supply lines, however, must be maintained in an uncurled condition during this relatively long period of storage in order to prevent the lines from taking a permanent set. Normally, the lines are stored in a vertical upright position to prevent curling. To this end, a nail 78 is passed through the hole 73 formed in bracket 70 and the nail is tacked to the tree well above the supply line 43. In this manner, the plugged assembly can be hung in a stored condition with the drop line extended in a vertical position as shown.

While this invention has been described with specific reference to the details as set forth above, it is not intended to be limited to this specific structure and the invention is intended to cover any modifications or changes that may come within the scope of the following claims.

I claim:

1. In a sap gathering system of the type wherein a main sap collecting line is positioned below bore holes in a plurality of trees so that sap from the trees can flow by gravity from the bore holes into the collecting line, said system including a tap for insertion into a bore hole, said tap having a housing containing an enclosed chamber, a hollow spout outwardly disposed from the housing having an open end that is insertable within the bore hole so that sap flows from the hole into the chamber, a first downwardly disposed flow connector depending from the housing and a second upwardly disposed flow connector in the collecting line, a vertically disposed drop line mounted in fluid flow communication between the two connectors whereby sap flowing into the chamber passes by gravity into the collecting line, an upraised bracket in the top of the housing having a hole for removably containing a spout plug, said plug having an elongated tapered body that fits in sealing engagement within the open end of the spout to close the spout when the tap is removed from the bore hole, hanger means secured to the tree above said collecting line for engaging the hole in said bracket to suspend the tap in a stored position above the collecting line when said spout is removed from the bore hole and sealed with said plug whereby the drop line is hung in a vertical position above the collecting line, and a flexible strap attaching the plug to the tap.

2. The system of claim 1 wherein the hole in said bracket and the opening in the spout each contain a taper that has an angle which is different than that of the plug whereby the plug can be frictionally locked in both the hole end the opening.

3. The system of claim 1 wherein the plug and the tap are both formed of a hard plastic material.

* * * * *

UNITED STATES PATENT AND TRADEMARK OFFICE
CERTIFICATE OF CORRECTION

PATENT NO. : 4,512,104
DATED : April 23, 1985
INVENTOR(S) : ROBERT M. LAMB

It is certified that error appears in the above—identified patent and that said Letters Patent is hereby corrected as shown below:

Column 6, line 39 - "end" should be --and--.

Signed and Sealed this

Twenty-seventh Day of August 1985

[SEAL]

Attest:

DONALD J. QUIGG

Attesting Officer

Acting Commissioner of Patents and Trademarks